(12) United States Patent
Choi et al.

(10) Patent No.: US 12,515,964 B2
(45) Date of Patent: Jan. 6, 2026

(54) TIN OXIDE FORMING COMPOSITION

(71) Applicant: LG Chem, Ltd., Seoul (KR)

(72) Inventors: Jung Ho Choi, Daejeon (KR); In Sung Hwang, Daejeon (KR); Hun Min Park, Daejeon (KR); Dong Chul Lee, Daejeon (KR); Gyo Hyun Hwang, Daejeon (KR); Kwang Hyun Kim, Daejeon (KR); Jung Up Bang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1000 days.

(21) Appl. No.: 17/608,357

(22) PCT Filed: Sep. 14, 2020

(86) PCT No.: PCT/KR2020/012366
§ 371 (c)(1),
(2) Date: Nov. 2, 2021

(87) PCT Pub. No.: WO2021/060753
PCT Pub. Date: Apr. 1, 2021

(65) Prior Publication Data
US 2022/0259062 A1   Aug. 18, 2022

(30) Foreign Application Priority Data

Sep. 26, 2019   (KR) .................. 10-2019-0119109

(51) Int. Cl.
*C01G 19/02*    (2006.01)
*C23C 22/48*    (2006.01)
(Continued)

(52) U.S. Cl.
CPC .............. *C01G 19/02* (2013.01); *C23C 22/48* (2013.01); *C25B 1/34* (2013.01); *C25B 11/0775* (2021.01); *C01P 2006/40* (2013.01)

(58) Field of Classification Search
None
See application file for complete search history.

(56) References Cited

U.S. PATENT DOCUMENTS

2003/0178751 A1   9/2003   Song et al.
2006/0153982 A1   7/2006   Morozov et al.
(Continued)

FOREIGN PATENT DOCUMENTS

CN   101014537 A   8/2007
CN   102479824 A   5/2012
(Continued)

OTHER PUBLICATIONS

Renner, H.; Schlamp, G.; Kleinwächter, I.; Drost, E.; Lüschow, H. M.; Tews, P.; Panster, P.; Diehl, M.; et al. (2002). "Platinum group metals and compounds". Ullmann's Encyclopedia of Industrial Chemistry. Wiley. doi:10.1002/14356007.a21_075. ISBN 3527306730. (Year: 2002).*

(Continued)

*Primary Examiner* — Anthony J Zimmer
*Assistant Examiner* — Zachary John Baum
(74) *Attorney, Agent, or Firm* — Lerner David LLP

(57) ABSTRACT

The present invention provides a tin oxide forming composition and a tin oxide forming method using the tin oxide forming composition. The tin oxide forming composition of the present invention is easy to manufacture and is capable of forming a tin oxide with a high yield.

7 Claims, 1 Drawing Sheet

(51) Int. Cl.
*C25B 1/34* (2006.01)
*C25B 11/077* (2021.01)

(56) References Cited

U.S. PATENT DOCUMENTS

| | | |
|---|---|---|
| 2007/0295938 A1 | 12/2007 | Fujii et al. |
| 2008/0260622 A1 | 10/2008 | Graham |
| 2014/0224666 A1* | 8/2014 | Kintrup .................. B01J 23/462 427/126.3 |
| 2015/0011044 A1 | 1/2015 | Choi et al. |
| 2017/0306512 A1 | 10/2017 | Gargiulo et al. |
| 2018/0294479 A1 | 10/2018 | Johnson et al. |
| 2020/0176766 A1 | 6/2020 | Johnson et al. |
| 2022/0310993 A1 | 9/2022 | Johnson et al. |

FOREIGN PATENT DOCUMENTS

| | | | | |
|---|---|---|---|---|
| CN | 104178928 A | | 12/2014 | |
| CN | 104528809 A | * | 4/2015 | ............ B82Y 30/00 |
| CN | 108624920 A | | 10/2018 | |
| CN | 108910941 A | | 11/2018 | |
| CN | 109876182 A | | 6/2019 | |
| CN | 110194483 A | | 9/2019 | |
| GB | 2075062 A | * | 11/1981 | ......... C25B 11/0478 |
| JP | 2005219979 A | | 8/2005 | |
| JP | 2020517084 A | | 6/2020 | |
| KR | 20030075991 A | | 9/2003 | |
| KR | 20060052940 A | | 5/2006 | |
| KR | 20070034010 A | | 3/2007 | |
| KR | 20100042766 A | | 4/2010 | |
| KR | 20140070680 A | | 6/2014 | |
| KR | 20150006284 A | | 1/2015 | |
| KR | 20170086104 A | | 7/2017 | |
| KR | 101778259 B1 | * | 9/2017 | |
| KR | 20190024143 A | | 3/2019 | |

OTHER PUBLICATIONS

English translation of KR 101778259 B1 Description. (Year: 2017).*
English translation of CN-104528809-A Description. (Year: 2015).*
CRC. Concentrative Properties of Aqueous Solutions, in Handbook of Chemistry and Physics 105th Edition. CRC Press, Taylor & Francis Group, an Informa Group company (2023). (Year: 2023).*
Ashland. PVP Polyvinylpyrrolidone Polymers, 2014. Accessed electronically at https://future4200.com/uploads/default/original/2X/2/2905229291697b5c568ecc12d7c6032cb1677003.pdf on Jul. 21, 2025. (Year: 2014).*
Mason Corporation. Stannous sulfate solution, 2025. Accessed electronically at https://tinchemical.com/products-services/stannous-sulfate-solution/ on Jul. 21, 2025. (Year: 2025).*
International Search Report for PCT/KR2020/012366 dated Dec. 22, 2020. 3 pgs.
Extended European Search Report including Written Opinion for Application No. 20868626.1 dated Nov. 8, 2022, pp. 1-7.
Fang D. et al., "Chlor-alkali technology" Chemical Industry Press, Jul. 1990, first edition, pp. 1-10.
Balko. E.N. et al., "Iridium-tin mixed oxide anode coatings" Journal of Applied Electrochemistry, Aug. 1991, pp. 678-682, vol. 21.
Search Report dated Dec. 10, 2022 from the Office Action for Chinese Application No. 202080031863.9 issued Dec. 15, 2022, pp. 1-3. [See p. 1, categorizing the cited references].

* cited by examiner

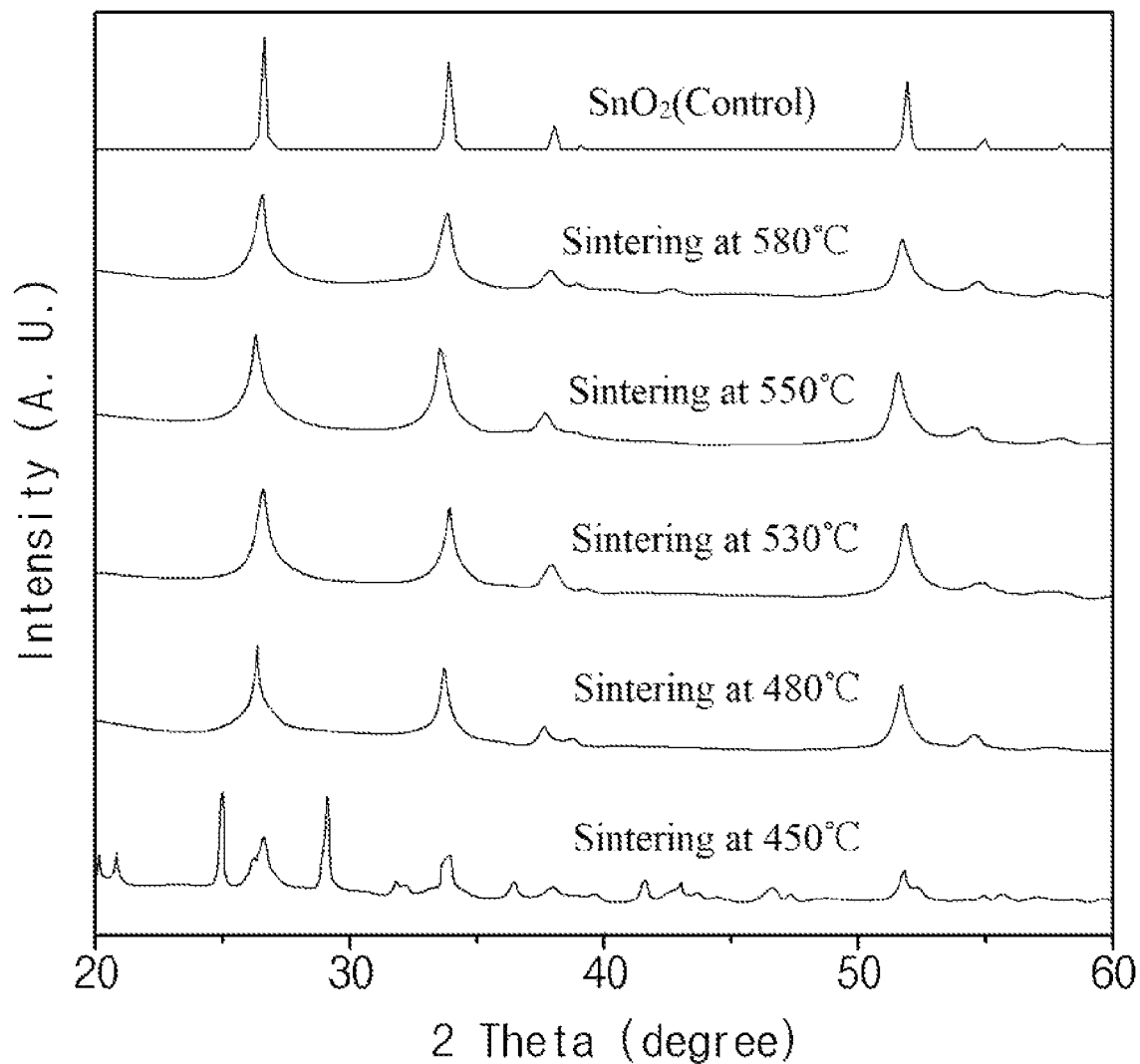

TIN OXIDE FORMING COMPOSITION

CROSS-REFERENCE TO RELATED APPLICATIONS

The present application is a national phase entry under 35 U.S.C. § 371 of International Application No. PCT/KR2020/012366, filed on Sep. 14, 2020, which claims priority to Korean Patent Application No. 10-2019-0119109, filed on Sep. 26, 2019, the disclosures of which are incorporated herein in their entirety by reference.

TECHNICAL FIELD

The present invention relates to a tin oxide forming composition capable of forming a tin oxide with high yield and a tin oxide forming method using the same.

BACKGROUND ART

A technology for electrolyzing low-cost brine such as seawater to produce hydroxides, hydrogen, and chlorine is well known. Such an electrolysis process is also commonly referred to as a chlor-alkali process, and can be referred to as a process in which the performance and the reliability of technology have already been demonstrated with commercial operation for several decades.

For the electrolysis of brine, an ion exchange membrane method, in which an ion exchange membrane is installed inside an electrolytic cell so that the electrolytic cell is divided into a cation chamber and an anion chamber, and the brine is used as an electrolyte to obtain a chlorine gas from the anode and obtain hydrogen and caustic soda from the cathode, is most widely used in recent years.

On the other hand, the chlor-alkali process of brine is made through a reaction as shown in the electrochemical scheme.

Anode reaction: $2Cl^- \rightarrow Cl_2 + 2e^-$ ($E^0 = +1.36$ V)
Cathode reaction: $2H_2O + 2e^- \rightarrow 2OH^- + H_2$ ($E^0 = -0.83$ V)
Overall reaction: $2Cl^- + 2H_2O \rightarrow 2OH^- + Cl_2 + H_2$ ($E^0 = -2.19$ V)

In performing the electrolysis of the brine, with respect to the electrolysis voltage, a theoretical voltage that is needed for electrolysis of brine as well as an overvoltage of the anode, an overvoltage of the cathode, a voltage due to the resistance of the ion exchange membrane, and a voltage due to the distance between the anode and the cathode should all be considered, and the overvoltages due to the electrodes among these voltages have been acting as an important variable.

Thus, studies on a method, which can reduce the overvoltages of the electrodes, have been carried out, and for example, a precious metal-based electrode, called Dimensionally Stable Anode (DSA), has been developed and used as an anode, and for a cathode, development of an excellent material with durability and low overvoltage has been required.

Stainless steel or nickel has been primarily used as the cathode, and a method, in which the surface of the stainless steel or nickel is coated with a nickel oxide, an alloy of nickel and tin, a combination of activated carbon and oxide, a ruthenium oxide, platinum, etc. and used, has recently been studied in order to reduce the overvoltage.

However, there is a problem in the case of introducing a coating layer containing tin among the method of introducing the coating layer to the electrode surface as described above. Due to the high volatility of the intermediate product that may occur during the process of introducing the coating layer, the yield of tin in the coating layer is low, the composition of the coating layer is also not uniform, and the scattered coating layer may cause equipment contamination. In order to solve this problem, a tin precursor having a complex ion is sometimes used, but in this case, since a complex synthesis process is required, it is difficult to prepare a precursor and the cost is increased.

PRIOR ART LITERATURE (Patent literature 1) KR 2017-0086104A
(Patent literature 2) KR 2006-0052940A

DISCLOSURE OF THE INVENTION

Technical Problem

An aspect of the present invention is to provide a tin oxide forming composition capable of forming tin oxide with a high yield while manufacturing is simple and a tin oxide forming method using the same.

Technical Solution

In order to solve the problems, the present invention provides a tin oxide forming composition comprising a tin precursor, sulfate ions, and a solvent, and a molar ratio of sulfate ions to tin (sulfate ions/tin) of 1 or more. In addition, the present invention provides a tin oxide forming method comprising the step (S1) of sintering a tin oxide forming composition at a temperature of 480° C. or higher.

Advantageous Effects

The tin oxide forming composition according to the present invention is easy to manufacture and economical, and the composition is capable of forming tin oxide with a high yield, and can be applied equally to the existing electrode manufacturing process.

BRIEF DESCRIPTION OF THE DRAWINGS

FIG. 1 shows an XRD graph when tin oxide forming compositions according to embodiments of the present invention were sintered at different temperatures.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Tin Oxide Forming Composition

The inventor of the present invention discovered that when a tin precursor and sulfate ions are present at the same time, and a molar ratio of the sulfate ions and the tin in a composition is 1 or more, a volatilization of an intermediate product in the process of forming a tin oxide from the tin precursor can be suppressed, and thus the yield of the tin oxide formed finally can be dramatically increased, thereby completing the present Specifically, the present invention provides a tin oxide forming composition including a tin precursor, sulfate ions, and a solvent, and having a molar ratio of sulfate ions to tin (sulfate ions/tin) of 1 or more.

Tin oxide is formed from the tin precursor, and the tin precursor may be used as long as it can be converted to the tin oxide under high temperature conditions. For example, the tin precursor may be an ion of tin itself, that is, a tin ion, or a tin halogenated compound (including hydrates of tin halide compounds) including tin (II or IV) chloride, or a tin alkoxide compound including tin isopropoxide, or a compound selected from the group consisting of tin acetate, tin sulfate, and tin 2-ethylhexanoate. In the case of using such a tin precursor, it is possible to form a tin oxide with uniform physical properties since the tin precursor can be uniformly distributed in the solvent while the tin oxide is easily formed thereafter.

A concentration of the tin precursor in the tin oxide forming composition may vary depending on a type of the tin precursor, a type of the solvent, and a solubility of the tin precursor in the solvent. However, the concentration may be generally 0.01 to 10M, preferably 0.05 to 5M based on tin ions. If the concentration of the tin precursor is lower than the foregoing range, an amount of the tin oxide to be formed is small, and thus it may not be economical in terms of cost. On the other hand, when the concentration of the tin precursor is greater than the foregoing range, the amount of sulfate ions to be added in the composition is excessively increased, making it difficult to perform handling at a manufacturing step or after manufacturing. In addition, in some cases, a sediment may occur, and thus a tin oxide may not be produced uniformly.

The sulfate ions ($SO_4^{2-}$) serve to suppress a volatilization of an intermediate product generated in the forming process from the tin precursor to the tin oxide formation, thereby increasing a yield of the tin oxide finally produced. The sulfate ions may be added to the solvent in the form of a compound capable of being dissolved in the solvent to generate sulfate ions. For example, the sulfate ions may be generated by dissolving at least one compound selected from the group in the consisting of sulfuric acid ($H_2SO_4$), sodium sulfate ($Na_2SO_4$), calcium sulfate ($CaSO_4$), potassium sulfate ($K_2SO_4$) and ammonium sulfate (($NH_4)_2SO_4$) in the solvent.

The concentration of sulfate ions in the tin oxide forming composition may vary depending on the type and concentration of the tin precursor or the type of the solvent in the composition, but may be generally 0.01 to 10M, preferably 0.05 to 5M. When the concentration of sulfate ions is less than the foregoing range, the function of the sulfate ions is not sufficiently exhibited, and the yield of tin oxide may decrease. On the other hand, when the concentration of sulfate ions is greater than the foregoing range, the sulfate ions cannot be removed properly during a mild drying-sintering process, and thus, it may act as a large amount of impurities.

Meanwhile, a molar ratio of the sulfate ions to tin in the composition provided by the present invention (sulfate ions/tin) may be 1 or more, preferably 3 or more, and 20 or less or 15 or less, preferably 10 or less. When the molar ratio of the sulfate ions component to the tin component in the composition is less than the foregoing range, the function of the sulfate ions described above is not sufficiently achieved. Therefore, a yield of the tin oxide formed from the composition of the present invention may be low. In addition, on the contrary, when the molar ratio of the sulfate ions component to the tin component in the composition is greater than the foregoing range, there may be a problem that excessively present sulfate ions remain as impurities even after a formation of the tin oxide.

The solvent serves to uniformly dissolve the tin precursor and sulfate ions. As the solvent, any solvent may be used without particular limitation as long as it has solubility to the tin precursor and sulfate ions and does not adversely affect the tin oxide generation in the subsequent tin oxide generation step, and can be easily removed. In particular, at least one selected from the group consisting of water, alcohols (eg, ethanol, isopropanol or n-butanol), and ketones (eg, dimethyl ketone, diethyl ketone, or methyl ethyl ketone) may be used as a solvent. Particularly, at least one selected from the group consisting of water, ethanol, isopropanol, n-butanol and methyl ethyl ketone is preferred. When using such a solvent, the stability of the tin oxide forming composition can be ensured, and uniform tin oxide formation afterwards is possible.

Meanwhile, the solvent may further include an additional component to improve the dispersibility of a dissolved solute or improve solubility. For example, ethoxy ethanol or butoxy ethanol may be further included to improve the dispersibility of the solute, and hydrochloric acid or hydrogen peroxide may be further included to improve solubility.

In the present invention, the tin oxide forming composition may further include a platinum group precursor. When the tin oxide forming composition further includes a platinum group precursor, a composite metal oxide including a tin oxide and a platinum group oxide may be finally formed.

As the platinum group precursor, a ruthenium precursor and/or an iridium precursor may be used. Specifically, when the platinum group precursor is a ruthenium precursor, at least one compound selected from the group consisting of ruthenium iodide and ruthenium acetate may be used as the platinum group precursor. Specifically, when the platinum group precursor is a ruthenium precursor, at least one compound selected from the group consisting of ruthenium hexafluoride ($RuF_6$), ruthenium (III) chloride ($RuCl_3$), ruthenium (III) chloride hydrate ($RuCl_3xH_2O$), ruthenium (III) nitrosyl chloride ($Ru(NO)Cl_3$), hexaammine ruthenium (III) Chloride ($Ru(NH3)_6Cl_3$), ruthenium (III) bromide ($RuBr_3$), ruthenium (III) bromide hydrate ($RuBr_3xH_2O$), ruthenium iodide ($RuI_3$) and ruthenium acetate may be used as the platinum group precursor, in addition, preferably, at least one selected from the group consisting of ruthenium (III) chloride hydrate ($RuCl_3xH_2O$), ruthenium(III) nitrosyl chloride ($Ru(NO)Cl_3$), hexaammine ruthenium (III) chloride ($Ru(NH_3)_6Cl_3$) and ruthenium acetate may be used. In the case of using the ruthenium precursor listed above, there is an advantage in that a formation of a composite metal oxide including ruthenium oxide and tin oxide is easy, and the yield is high.

Meanwhile, in the present invention, when the platinum group precursor is an iridium precursor, at least one compounds selected from the group consisting of iridium chloride hydrate ($IrCl_3 \cdot xH_2O$) and hydrogen hexachloroiridate hexahydrate ($H_2IrCl_6 \cdot 6H_2O$) may be used as the platinum group precursor. As in the case of the ruthenium precursor, when the iridium precursor listed above is used, there is an advantage in that it is easy to form a composite metal oxide including an iridium oxide and a tin oxide, and that the yield is high.

Tin Oxide Forming Method

The present invention provides a tin oxide forming method using the tin oxide forming composition described above. Specifically, the present invention provides a tin oxide forming method including a step (S1) of sintering the above-described tin oxide forming composition at a temperature of 480° C. or higher.

Due to a high-temperature sintering in this step, a tin precursor is converted to a tin oxide in the presence of sulfate ions, and the sintering temperature may be 480° C. or higher, preferably 550° C. or higher in order to supply sufficient energy for conversion. If the sintering temperature is lower than the foregoing temperature, sufficient energy required for conversion to oxide may not be supplied, and thus uniform tin oxide may not be formed. In particular, when the sintering temperature is 550° C. or higher, a tin oxide can be formed and sulfate ions contained in the tin oxide forming composition can be smoothly removed.

The sintering in this step may be performed for 30 minutes or more, preferably 60 minutes or more. When the sintering time is shorter than the foregoing time, the tin oxide may not be sufficiently formed.

The sintering in this step may be performed immediately in the state of the composition, or may be performed after applying the composition to another object. For example, the tin oxide forming composition may be coated on a metal substrate and then sintered to form a coating layer containing the tin oxide on the surface of the metal substrate. The application may be performed by any one method selected from the group consisting of, for example, doctor blade, die casting, comma coating, screen printing, spray spraying, electrospinning, roll coating, and a brushing. In the case of sintering after applying the composition as described above, the process of applying and sintering may be repeated a plurality of times.

The tin oxide forming method of the present invention may further include drying (S0) at a temperature of 50 to 300° C., preferably 50 to 200° C. before the sintering. When the drying step before the sintering is performed, the tin oxide may be more easily formed. The drying may be performed for 5 to 60 minutes, preferably 5 to 30 minutes.

Hereinafter, examples and experimental examples are described in more detail in order to describe the present invention in detail, but the present invention is not limited to these examples and experimental examples. The embodiments according to the present invention may be modified in various forms, and the scope of the present invention should not be construed as being limited to the embodiments described. The embodiments of the present invention are provided to more completely describe the present invention to those of ordinary skills in the art.

EXAMPLE 1

A tin oxide forming composition was prepared by dissolving tin chloride (II) dihydrate and sulfuric acid ($H_2SO_4$) in deionized water as a solvent. The molar ratio of sulfate ions ($SO_4^{2-}$) to the tin component in the composition was set to be 3.

EXAMPLE 2

A tin oxide forming composition was prepared in the same manner as in Example 1, except that tin 2-ethylhexanoate was dissolved as a tin precursor.

EXAMPLE 3

A tin oxide forming composition was prepared in the same manner as in Example 1, except that tin sulfate ($SnSO_4$) was directly dissolved.

EXAMPLE 4

A tin oxide forming composition was prepared by dissolving ruthenium chloride trihydrate, iridium chloride trihydrate, and tin chloride (II) dihydrate in an excess of 1M sulfuric acid aqueous solution so that the molar ratio of Ru:Ir:Sn was 35:20:45. The molar ratio of sulfate ions ($SO_4^{2-}$) to the tin component in the composition was set to be 8.

EXAMPLE 5

A tin oxide forming composition was prepared in the same manner as in Example 4, except that tin sulfate was directly dissolved as a tin precursor.

Comparative Example 1

A tin oxide forming composition was prepared in the same manner as in Example 1, except that sulfuric acid was not dissolved.

Comparative Example 2

A tin oxide forming composition was prepared in the same manner as in Example 2, except that sulfuric acid was not dissolved.

Comparative Example 3

A tin oxide forming composition was prepared in the same manner as in Example 1, except that the molar ratio of sulfate ions ($SO_4^{2-}$) to the tin component in the composition was set to 0.7.

Comparative Example 4

A tin oxide forming composition was prepared in the same manner as in Example 4, except the matter that n-butanol was used as a solvent.

The components and content ratios of the tin oxide forming compositions prepared in Examples and Comparative Examples are summarized in Table 1.

TABLE 1

| | Metal precursor | Solvent | Sulfate ions/tin mole ratio |
|---|---|---|---|
| Example 1 | Tin chloride dihydrate | Water | 3 |
| Example 2 | Tin ethylhexanoate | Water | 3 |
| Example 3 | Tin sulfate | Water | 3 |
| Example 4 | Ruthenium chloride trihydrate/Iridium chloride trihydrate/Tin chloride dihydrate (35:20:45) | Water | 8 |
| Example 5 | Ruthenium chloride trihydrate/Iridium chloride trihydrate/Tin sulfate (35:20:45) | Water | 8 |
| Comparative Example 1 | Tin chloride dihydrate | Water | 0 |
| Comparative Example 2 | Tin ethylhexanoate | Water | 0 |

TABLE 1-continued

|  | Metal precursor | Solvent | Sulfate ions/tin mole ratio |
|---|---|---|---|
| Comparative Example 3 | Tin chloride dihydrate | Water | 0.7 |
| Comparative Example 4 | Ruthenium chloride trihydrate/Iridium chloride trihydrate/Tin chloride dihydrate (35:20:45) | n-butanol | 0 |

Experimental Example 1

Confirmation of Yield of Prepared Tin Oxide Forming Composition

The tin oxide forming compositions prepared in Examples 1 to 4 and Comparative Examples 1 to 2 were sintered, and yields were calculated from the weights of the tin oxides obtained as a result of the sintering. The yields were calculated using Equations 1 and 2, and the results are shown in Table 2.

Yield={(weight of sample after sintering)/(number of moles of Sn in sample before sintering×molecular weight of $SnO_2$)}×100     [Equation 1]

Examples 1 to 3 and Comparative Examples 1 to 2 including only a tin precursor as a metal precursor were calculated using Equation 1 above.

Yield=(weight of sample after sintering)/((number of moles of Ru in sample before sintering×molecular weight of $RuO_2$)+(number of moles of Ir in sample before sintering×molecular weight of $IrO_2$)+(number of moles of Sn in sample before sintering×Molecular weight of $SnO_2$)}×100[     [Equation 2]

In the case of Example 4 further including ruthenium and iridium precursors in addition to the tin precursor as a metal precursor, the yield was calculated by Equation 2.

TABLE 2

|  | Metal sample weight (g) | Sample weight after sintering (g) | Yield (%) | Sintering temperature (° C.) | Sintering time (minutes) |
|---|---|---|---|---|---|
| Example 1 | 1.2063 | 0.7977 | 99.0 | 550 | 60 |
| Example 2 | 1.1554 | 0.4238 | 98.6 | 550 | 60 |
| Example 3 | 1.0898 | 0.7344 | 100.9 | 550 | 60 |
| Example 4 | 1.7180 | 1.0050 | 97.0 | 550 | 60 |
| Comparative Example 1 | 1.0189 | 0.2634 | 43.8 | 480 | 60 |
| Comparative Example 2 | 1.0922 | 0.2026 | 53.5 | 480 | 60 |
| Comparative Example 3 | 0.8375 | 0.4580 | 81.9 | 550 | 60 |

From the above results, it was confirmed that when the tin oxide forming compositions of the embodiments of the present invention containing a tin precursor and sulfate ions together was sintered, a higher yield was exhibited and particularly, from Comparative Example 3, when the ratio of tin and sulfate ions did not satisfy the scope of the present invention, a sufficient degree of yield could not be obtained.

Experimental Example 2

XRD and Yield Change Check According to Sintering Temperature

In addition, as shown in FIG. 1, XRD was confirmed while changing a sintering temperature to 450° C., 480° C., 530° C., 550° C. and 580° C., wherein pure $SnO_2$ was used as a control.

As shown in FIG. 1, it was confirmed that tin oxide was not easily formed when the tin oxide forming composition was sintered at a temperature of less than 480° C. On the other hand, it was confirmed that most of the tin precursors were converted to tin oxide at a temperature of 480° C. or higher.

In addition, the yield was calculated by sintering the tin oxide forming composition of Example 1 at two different temperatures. The results are shown in Table 3.

TABLE 3

| Sintering temperature (° C.) | Metal sample weight (g) | Sample weight after sintering (g) | Yield (%) |
|---|---|---|---|
| 550 | 1.2063 | 0.7977 | 99.0 |
| 480 | 1.0922 | 0.9774 | 134.0 |

From Table 3, it can be confirmed that when a sintering temperature is less than 550° C., the yield exceeds 100% because sulfate ions were not completely removed. In this regard, as a result of elemental analysis of the result obtained when the yield exceeds 100%, it was calculated that the sulfur content was 7.6%.

On the other hand, when the sintering temperature was 550° C. or higher, most of the sulfate ions were removed, and it was confirmed that the yield converged to 100%. Accordingly, in the case of using the tin oxide forming composition of the present invention, it is possible to reduce the amount of energy used in the sintering process by performing sintering at a relatively low temperature in a region that is not related to sulfate ions while requiring the formation of a tin oxide. However, it was confirmed that most of the sulfate ions could be removed by a sintering at a temperature of 550° C. or higher in a region where removal of sulfate ions is important.

Experimental Example 3

EDS Analysis when Electrode is Applied

A titanium expanded substrate blast-treated with white alumina was pretreated in 10% oxalic acid aqueous solution (90° C.) for 2 hours to form irregularities, washed with distilled water, and dried to prepare a metal substrate. Tin oxide forming composition of each of Examples 4 and 5 and Comparative Example 3 was applied to the prepared metal substrate. After that, the composition was dried at 70° C. and sintered at 550° C. for 10 minutes. The coating, drying and sintering were repeated until the applied amount of the composition reach 20 g/m$^2$, and then finally sintered at 550° C. for 60 minutes to prepare an electrode. The prepared electrode surface was analyzed by EDS to calculate the molar ratio of each metal component present in the electrode coating layer, which is shown in Table 4.

TABLE 4

| | EDS analysis result (mol %) | | |
| --- | --- | --- | --- |
| | Ru | Ir | Sn |
| Example 4 | 34.0 | 18.0 | 48.0 |
| Example 5 | 36.6 | 18.4 | 45.0 |
| Comparative Example 4 | 42.6 | 24.8 | 32.6 |

As a result of EDS analysis, in Examples 4 and 5, the ratio of each metal component of the electrode coating layer was similar to the ratio of each metal precursor in the tin oxide forming composition, so that most of the tin precursors were converted to oxides like ruthenium and iridium. On the other hand, in Comparative Example 3, the ratio was different, and it was confirmed that the tin precursor was converted to a tin oxide in a relatively small amount compared with ruthenium and iridium.

The invention claimed is:

1. A composition for an electrode in a chlor-alkali process, wherein the composition comprises:
    a tin precursor;
    a platinum group precursor;
    sulfate ions; and
    a solvent,
    wherein a molar ratio of sulfate ions to tin (sulfate ions/tin) is 3 to 10,
    wherein a concentration of the sulfate ions in the composition is 0.01 M to 10 M,
    wherein a concentration of tin ions in the composition is 0.01 M to 10 M, and
    wherein the platinum group precursor is at least one compound selected from the group consisting of ruthenium hexafluoride ($RuF_6$), ruthenium (III) chloride ($RuCl_3$), ruthenium (III) chloride hydrate ($RuCl_3 \cdot XH_2O$), ruthenium (III) nitrosyl chloride ($Ru(NO)Cl_3$), hexaammine ruthenium (III) Chloride ($Ru(NH_3)_6Cl_3$), ruthenium (III) bromide ($RuBr_3$), ruthenium (III) bromide hydrate ($RuBr_3 \cdot xH_2O$), ruthenium iodide ($RuI_3$), ruthenium acetate, iridium chloride hydrate ($IrCl_3 \cdot xH_2O$), and hydrogen hexachloroiridate hexahydrate ($H_2IrCl_6 \cdot 6H_2O$).

2. The tin oxide forming composition of claim 1, wherein the tin precursor is at least one selected from the group consisting of tin ions, tin halogenated compounds, tin alkoxide compounds, tin acetate, tin sulfate, and tin 2-ethylhexanoate.

3. The tin oxide forming composition of claim 1, wherein the solvent is at least one selected from the group consisting of water, alcohols and ketones.

4. A tin oxide forming method comprising sintering the tin oxide forming composition of claim 1 at a temperature of 480° C. or higher.

5. The tin oxide forming method of claim 4, further comprising drying the tin oxide forming composition at a temperature of 50 to 300° C. before the sintering.

6. The tin oxide forming method of claim 4, wherein the sintering is carried out for 30 to 120 minutes.

7. The tin oxide forming method of claim 4, wherein the sintering temperature is 550° C. or higher.

* * * * *